United States Patent Office 3,232,801
Patented Feb. 1, 1966

3,232,801
GELLED FUEL COMPOSITIONS
John J. Bost, Sacramento, Albert Cera, Rancho Cordova, and Jackie A. Cabeal, Citrus Heights, Calif., assignors to Aerojet-General Corporation, Azusa, Calif., a corporation of Ohio
No Drawing. Filed Oct. 16, 1962, Ser. No. 232,331
8 Claims. (Cl. 149—19)

This invention relates to a new fuel composition suitable for use in rockets, missiles and the like.

More specifically, this invention relates to gelled liquid hydrazine propellants which offer advantages over neat liquid hydrazine. Liquid hydrazine is a well-known liquid rocket fuel. However, heretofore its use has presented various problems. For example, when liquid hydrazine is used in a liquid rocket engine, it tends to slosh within the fuel tanks during the flight of the rocket. The sloshing can adversely affect the stability of the rocket causing it to uncontrollably alter course. Still another problem involved in the use of liquid hydrazine is that it presents a safety hazard, since it can easily escape through ruptured or perforated tanks or lines. Such spills can cause disastrous fires and explosions.

Hydrazine is frequently combined with powdered metals such as powdered aluminum or powdered beryllium in order to raise the specific impulse. However, when mixtures of hydrazine and powdered metals are allowed to stand, the powdered metal tends to settle to the bottom. Such mechanical instability of the metalized hydrazine can cause variations in the composition of the fuel being fed to the firing chamber of the rocket engine during operation. These variations can cause an erratic thrust output which can result in the rocket deviating from its programmed course. Accordingly, it is desirable to prepare a hydrazine fuel preferably containing powdered metal which is in a gelled, mechanically stable condition. Various gelling agents have been used in the past for this purpose. However, the gelling agents previously employed in hydrazine generally have been required in relatively high concentration. This was undesirable since the gelling agent is normally either completely unenergetic, as in the case of flocculated silica, or of only comparatively low energy as in the case of carbon black.

It is an object of this invention to prepare mechanically stable gelled hydrazine fuels, preferably containing powdered metal, which are free of low energy additives such as carbon black and silica, and which contain a new gelling agent which is employed in an effective amount up to about 2.0 percent by weight of the total fuel composition. Normally an effective amount is at least 0.5 percent by weight of gelling agent based on the total weight of the gelled hydrazine fuel composition. These amounts are smaller than those found to be effective with previously known gelling agents. It is another object of this invention to provide such a gelling agent suitable for use in low concentration which is fully combustible upon contact with oxidizer and thus does not constitute complete dead weight in the fuel composition. Still another object of this invention is to provide a gelled hydrazine fuel which will aid in the operation of liquid rockets through the reduction or elimination of sloshing. In still another aspect of this invention it is an object to provide a gelled thixotropic fuel which readily becomes liquid under pump pressure and thus can be easily pumped through the nozzles of a rocket engine. It is a further object of this invention to prepare gelled hydrazine propellants possessing improved safety because flow from ruptured tanks and lines is prevented and thus fire hazards are reduced. These and other objects of this invention will be apparent from the detailed description which follows.

It has now been found that a mechanically stable hydrazine gelled propellant is obtained upon the incorporation in liquid hydrazine of an effective amount up to about 2.0 percent by weight of the total fuel composition of a thixotropic gelling agent which is a polymer consisting essentially of the recurring unit of the following formula:

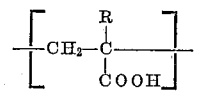

wherein R is hydrogen or methyl. The polymeric gelling agent normally contains, per molecule, from about 5,000 to about 70,000 of these repeating units and has a molecular weight of from about 400,000 to about 5,000,000. It is to be understood that the polymer of the above formula may contain in addition to the repeating units, chain terminating groups such as thiol, hydroxy, carboxy and the like. It should also be understood that the above repeating units may be randomly connected in either head to head or head to tail fashion.

Among the preferred gelling agents of this invention are those sold under the names Carbopol 934, Carbopol 940 and Carbopol 941, which are trademarks of the B. F. Goodrich Chemical Company. Each of these three materials consists essentially of polyacrylic acid, Carbopol 934 having an average molecular weight of around one million, and Carbopol 940 and Carbopol 941 each having an average molecular weight on the order of two to three million. These materials in substantially pure form are somewhat acidic due to the plurality of carboxy groups in the chain. Indicative of this acidity is the fact that about one mole of a base such as KOH is required to neutralize 75 grams of the Carbopols to a pH of 10.

As is noted above, the gelling agents of this invention need be employed in effective amounts up to 2.0 percent by weight of the total fuel composition. However, it should be understood that even greater amounts of the gelling agent may be employed, although such is normally to be avoided, since the gelling agents of this invention are completely effective at the low concentrations. Thus the use of more or additional gelling agent is of no further benefit.

Preferably, the gels of this invention should be substantially free of strong electrolytes; e.g., sodium chloride; since such materials tend to break the gel. For this reason, the hydrazine employed in this invention should be substantially pure, being on the order of 99.5 percent by weight of pure hydrazine.

There may be included in the gelled hydrazine fuels of this invention, as an optional ingredient, powdered metal such as aluminum or beryllium. These metals serve to increase the specific impulse of the fuel. The amount of powdered metal employed is not critical. Normally, if the powdered metal is added it is used in amounts from about 10 percent to about 40 percent by weight based on the total weight of the gelled fuel compositions. When these metals are incorporated in the gelled hydrazine compositions of this invention, it has been found that the resulting fuel is mechanically stable and that there is no tendency for the powdered metal to settle out of the gel.

Particle size of the powdered metal is not critical when employing the gelling agents of this invention. Preferably the powdered beryllium or powdered aluminum is in finely divided form, having a particle size less than about 45 microns.

The following examples are presented for purposes of illustration only and should not be regarded as limitative in any way. In the examples the parts and percentages are by weight unless otherwise indicated.

*Example I*

A gelled hydrazine propellant was prepared by mixing 99.5 parts of commercial hydrazine with 0.5 part of a gelling agent consisting essentially of a polyacrylic acid homopolymer having an average molecular weight of from 2,000,000 to about 3,000,000. The resulting gel was mechanically stable, would not flow under its own weight and exhibited thixotropic properties under the shear rates produced by rapid shaking of a container filled with the fuel composition.

When the above example was repeated, increasing the amount of gelling agent to 1 percent and 2 percent and correspondingly reducing the amount of hydrazine to 99 percent and 98 percent, respectively, satisfactory gels were obtained.

*Example II*

A gelled aluminum-hydrazine fuel was prepared in the following manner. The aluminum powder was degassed by heating under vacuum and then being exposed to a nitrogen atmosphere. Thirty-three parts of the degassed powdered aluminum and 0.5 part of the polymeric gelling agent employed in Example I were then added to 66.5 parts of commercial hydrazine. These ingredients were thoroughly mixed. The resulting fuel mixture had thixotropic properties as shown by Brookfield Viscometer. This device measures the drag on a spindle as it passes through the liquid at a specified rate. Brookfield Viscometer measurement with a Spindle No. 4 at 6 r.p.m. showed that the fuel had a viscosity of 30,000 c.p.s., and at 60 r.p.m. a viscosity of 7,000 cps. This mixture was found to be mechanically stable upon storage, no settling out being observed after a period of seven days. When the above example is repeated, decreasing the amount of powdered aluminum from 33 parts to 20 parts and correspondingly increasing the hydrazine content from 66.5 parts to 79.5 parts, the resulting fuel exhibited thixotropic properties. The gel exhibited excellent storage stability.

*Example III*

When Example II is repeated employing 33 parts of powdered beryllium in lieu of the aluminum powder, a thixotropic, storage-stable gel is obtained.

*Example IV*

When Example II was repeated, using 66 parts hydrazine, 33 parts powdered aluminum and 1.0 percent of the gelling agent, a thixotropic gel was obtained. Measured with the same viscometer as was employed in Example II, the viscosity at 6 r.p.m. was 53,000 cps. and and at 60 r.p.m., 10,000 cps.

In general it can be seen from the foregoing examples that the stable hydrazine gels of this invention are produced by mixing the gelling agent and, optionally the metal powder, with hydrazine. Normally the ingredients are effectively blended by shaking or mechanical agitation to uniformly distribute the gelling agent and to deagglomerate the powdered metal, if present.

The gelled fuel compositions of this invention are highly energetic and are therefore useful as fuel in liquid rocket motors.

While the invention has been specifically illustrated using essentially pure hydrazine as the liquid fuel, it is to be understood that mixtures of hydrazine with other compatible fuels such as unsymmetrical dimethyl hydrazine, may also be satisfactorily gelled, employing the gelling agents of this invention. For example, gelling agents of this invention are suitable in producing a hydrazine gel containing a minor amount, i.e., trace amounts up to about 20 to 30 parts by weight of the total fuel composition, of unsymmetrical dimethyl hydrazine.

It will be understood that various modifications may be made in this invention without departing from the spirit thereof or the scope of the appended claims.

We claim:

1. A gelled mechanically stable thixotropic high energy fuel composition comprising hydrazine, an effective amount up to about 2 percent by weight of a gelling agent which is a polymer consisting essentially of repeating units of the formula:

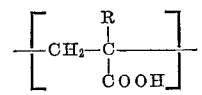

wherein R is selected from the group consisting of hydrogen and methyl, said polymer having a molecular weight of from about 400,000 to about 5,000,000.

2. A gelled mechanically stable thixotropic high energy fuel composition comprising hydrazine, an effective amount up to about 2 percent by weight of a gelling agent which is a polymer consisting essentially of repeating units of the formula:

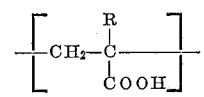

wherein R is selected from the group consisting of hydrogen and methyl, said polymer having a molecular weight of from about 400,000 to about 5,000,000, and from about 10 weight percent to about 40 weight percent of the total fuel composition of a powdered metal selected from the group consisting of aluminum and beryllium.

3. A gelled mechanically stable thixotropic high energy fuel composition, comprising hydrazine, about 0.5 weight percent to about 2.0 weight percent based on the total fuel composition of a gelling agent which is a polymer consisting essentially of repeating units of the formula:

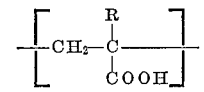

wherein R is selected from the group consisting of hydrogen and methyl, said polymer having a molecular weight of from about 400,000 to about 5,000,000.

4. A gelled mechanically stable thixotropic high energy fuel composition comprising about 99.5 weight percent of hydrazine and about 0.5 weight percent of a gelling agent which is a polymer consisting essentially of repeating units of the formula:

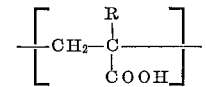

wherein R is selected from the group consisting of hydrogen and methyl, said polymer having a molecular weight of from about 400,000 to about 5,000,000.

5. A gelled mechanically stable thixotropic high energy fuel composition comprising about 66.5 weight percent of hydrazine, about 33 weight percent of powdered aluminum and about 0.5 weight percent of a gelling agent which is a polymer consisting essentially of repeating units of the formula:

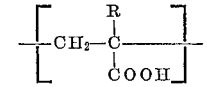

wherein R is selected from the group consisting of hydrogen and methyl, said polymer having a molecular weight of from about 400,000 to about 5,000,000.

6. A gelled mechanically stable thixotropic high energy fuel composition comprising about 98 weight percent of hydrazine and about 2 weight percent of a gelling agent which is a polymer consisting essentially of repeating units of the formula:

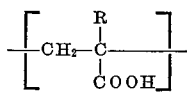

wherein R is selected from the group consisting of hydrogen and methyl, said polymer having a molecular weight of from about 400,000 to about 5,000,000.

7. A gelled mechanically stable thixotropic high energy fuel composition comprising about 66 weight percent of hydrazine, about 33 weight percent of powdered aluminum and about 1 weight percent of a gelling agent which is a polymer consisting essentially of repeating units of the formula:

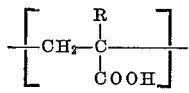

wherein R is selected from the group consisting of hydrogen and methyl, said polymer having a molecular weight of from about 400,000 to about 5,000,000.

8. A gelled mechanically stable thixotropic high energy fuel composition comprising a major amount of hydrazine, a minor amount of unsymmetrical dimethyl hydrazine, and an amount effective to produce a gel of a gelling agent which is a polymer consisting essentially of repeating units of the formula:

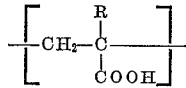

wherein R is selected from the group consisting of hydrogen and methyl, said polymer having a molecular weight of from about 400,000 to about 5,000,000.

References Cited by the Examiner

UNITED STATES PATENTS

| | | |
|---|---|---|
| 2,530,493 | 11/1950 | Van Loenen. |
| 2,610,114 | 9/1952 | Fischer et al. _____ 44—7 |
| 3,046,736 | 7/1962 | Thomson _____ 60—35.4 X |
| 3,048,966 | 8/1962 | Feraud et al. _____ 149—36 X |
| 3,077,072 | 2/1963 | Rice _____ 149—36 X |

REUBEN EPSTEIN, *Primary Examiner.*

LEON D. ROSDOL, CARL D. QUARFORTH,
*Examiners.*